United States Patent [19]

McCulloch et al.

[11] Patent Number: 4,725,399
[45] Date of Patent: Feb. 16, 1988

[54] PROBE WITH INTEGRATED HEATER AND THERMOCOUPLE PACK

[75] Inventors: Reginald W. McCulloch, Oak Ridge; Ralph E. Dial, Concord; Wilber K. R. Finnell, Kingston, all of Tenn.

[73] Assignee: Delta M Corporation, Oak Ridge, Tenn.

[21] Appl. No.: 788,780

[22] Filed: Oct. 18, 1985

[51] Int. Cl.⁴ .......................................... G21C 17/00
[52] U.S. Cl. .................................... 376/247; 136/211; 136/212; 374/166; 374/208
[58] Field of Search .................. 136/211, 212, 225; 376/247, 258; 374/163, 166, 208

[56] References Cited
U.S. PATENT DOCUMENTS

| | | | |
|---|---|---|---|
| 2,665,322 | 1/1954 | MacDonald | 136/4 |
| 4,075,036 | 2/1978 | Lysikov | 136/225 |
| 4,176,554 | 12/1979 | Kazmierowicz | 73/341 |
| 4,204,909 | 5/1980 | Gluggio et al. | 376/247 |
| 4,242,907 | 1/1981 | Kazmierowicz | 73/341 |
| 4,298,430 | 11/1981 | Rolstad et al. | 376/247 |
| 4,313,792 | 2/1982 | Smith | 376/247 |
| 4,393,025 | 7/1983 | Leyse | 376/247 |
| 4,406,011 | 9/1983 | Burns | 376/247 |
| 4,418,035 | 11/1983 | Smith | 376/247 |
| 4,425,297 | 1/1984 | Rolstad et al. | 376/247 |
| 4,439,396 | 3/1984 | Rolstad | 376/247 |
| 4,440,717 | 4/1984 | Bevilacqua et al. | 376/258 |
| 4,483,631 | 11/1984 | Kydd | 376/247 |
| 4,521,373 | 6/1985 | Terhune et al. | 376/247 |

Primary Examiner—Salvatore Cangialosi
Attorney, Agent, or Firm—Luedeka, Hodges & Neely

[57] ABSTRACT

A probe for measuring heat includes an elongate rod fitted within a sheath, and a plurality of annular recesses are formed on the surface of the rod in a spaced-apart relationship to form annular chambers that are resistant to heat flow. A longitudinal bore extends axially into the rod and within the cylinders defined by the annular chambers, and an integrated heater and thermocouple pack is dimensioned to fit within the bore. In construction, the integrated pack includes a plurality of wires disposed in electrical insulation within a sheath and a heater cable. These wires include one common wire and a plurality of thermocouple wires. The common wire is constructed of one type of conductive material while the thermocouple wires are each constructed of two types of materials so that at least one thermocouple junction is formed therein. All of the wires extend the length of the integrated pack and are connected together at their ends. The thermocouple wires are constructed to form thermocouple junctions proximate to each annular chamber for producing electromotive forces corresponding to the temperature of the rod within the annular chambers relative to outside the chambers. In the preferred embodiment, each thermocouple wire forms two thermocouple junctions, one junction being disposed within an annular chamber and the second junction being disposed outside of, but proximate to, the same annular chamber. In one embodiment two thermocouple wires are configured to double the sensitivity of the probe in one region.

4 Claims, 4 Drawing Figures

PROBE WITH INTEGRATED HEATER AND THERMOCOUPLE PACK

FIELD OF THE INVENTION

The present invention relates to probes for instruments which are commonly known as "gamma thermometers" for local measurement of power output in a nuclear device and particularly relates to a gamma thermometer probe having an integrated thermocouple pack that utilizes a minimum number of wires to form the desired thermocouples. These probes may also be used to detect the level of a coolant in a vessel.

BACKGROUND AND SUMMARY OF THE INVENTION

Gamma thermometers are well known in the nuclear industry and, in general, they measure gamma radiation to determine the power output of a nuclear reactor. The gamma thermometers measure the heat generated in metal when exposed to gamma radiation and, thus, indirectly determine the power level of the nuclear device.

One type of gamma thermometer, such as the instrument shown in U.S. Pat. No. 4,298,430, uses thermocouples to measure heat produced by gamma radiation and it is constructed with an elongate metal rod disposed within a metal sheath. Both the sheath and the rod are usually constructed of stainless steel and several annular recesses are formed on the surface of the rod. When the sheath is placed over the rod, annular chambers are formed by the recesses and the sheath which are resistant to heat transfer. Thus, the chambers resist radial flow of heat out of the gamma thermometer in the region of the chambers.

The rod usually includes a central longitudinal bore which serves as a conduit for electrical wiring necessary to construct thermocouples within the rod. A separate thermocouple element is placed in the bore for each separate annular chamber with one thermocouple element leading to one annular chamber. Each thermocouple element includes at least two lead wires for forming the thermocouple and insulation between the wires. The wires and the insulation for each separate thermocouple element are separately encased in a protective metal sheath and, again, this metal sheath is usually stainless steel. Since each thermocouple element is leading to a different chamber, each element is a different length.

There are numerous variations in the construction of these thermocouple elements. For example, a thermocouple element may consist of two wires of different materials enclosed within a sheath that join to form one thermocouple or the element may include two wires of the same material with a small segment of wire of a different material at the ends of the wires inserted to form two thermocouple junctions. Some thermocouple elements may include three wires, such as the element disclosed in U.S. Pat. No. 4,313,792, for creating two or more thermocouple junctions in the vicinity of the chamber. However, in each of these examples, a separate thermocouple element extends to the vicinity of a separate chamber.

In operation, gamma thermometers detect radiation by measuring heat. The gamma radiation is absorbed by the center rod of the gamma thermometer and the rod is heated. The gamma thermometer is usually immersed within a reactor in a coolant so that the thermal energy of the rod flows radially outwardly from the rod to the coolant. This radial heat flow is blocked within the region of the chambers and this region of the rod is heated to a higher temperature than the non-insulated portions of the rod. The thermocouples are placed in the rod to measure the temperature of the rod within the chambers either as an absolute temperature or as a relative temperature, or both. This temperature information is then used to calculate the power of the radiation.

Such conventional gamma thermometers have worked well, but they are difficult and expensive to produce primarily because of the small size of the components. In many applications, to produce a useful instrument, the elements forming the thermocouples must be very small in cross-section. For example, in some extreme applications, the entire gamma thermometer must have a cross-section of less than two millimeters. Even in more typical applications, the overall cross-sectional dimension of the gamma thermometer will be about 8 mm, and the cross-sectional diameter of the sheath covering the individual thermocouple elements will be dimensioned on the order of 0.5 mm. Since the wires must be contained within the sheath, the cross-sectional diameter of the thermocouple wires within the sheath must be about 0.1 mm. The expense of the known gamma thermometer is related in part to the difficulty and expense of producing components of this small size.

The present invention reduces the expense and difficulty of manufacturing the gamma thermometer by providing a design that reduces the overall number of wires necessary to construct the gamma thermometer. A conventional gamma thermometer will have at least two thermocouple wires for each chamber region to be monitored and, thus, will have a total wire count of at least twice the number of chambers. The present invention, in one embodiment, utilizes only one wire per chamber plus one additional common wire so that the total wire count is at least equal to the number of chambers plus one. The present invention also reduces the number of thermocouple element sheaths compared to conventional gamma thermometers. In a conventional gamma thermometer a separate thermocouple element is provided for each chamber. Thus, the total number of sheaths for thermocouple elements is equal to at least the number of chamber regions monitored. In one embodiment of the present invention, an integrated thermocouple pack is provided so that only one sheath is required for all of the thermocouple wires. In a conventional gamma thermometer each thermocouple element is made separately and is then laboriously assembled into the gamma thermometer. In the present invention, the integrated thermocouple pack is made as a single unit and then the single unit is assembled into the gamma thermometer. Since the present invention requires fewer wires and sheaths than a conventional gamma thermometer, the overall size of thermocouple elements can be made to have a much smaller diameter while using the same wire sizes, or the pack can be made to have the same diameter as a conventional gamma thermometer pack, but larger wire sizes may be used. Thus, significant advantages are achieved by the present invention over conventional gamma thermometers in terms of either reduced size for the same cost or the same size for a reduced cost.

In accordance with the preferred embodiment of the present invention, a probe is provided for detecting heat. The probe includes an outer elongate sheath having a cylindrical cross-section with an elongate rod have a cylindrical cross-section fitted within said sheath. The rod is constructed of stainless steel that absorbs gamma radiation and produces heat. A plurality of annular recesses are formed on the surface of the rod and are spaced apart one from the other along the length of the rod. These recesses are disposed adjacent to the gamma thermometer sheath and form annular chambers that are resistive to heat flow. An axial bore extends axially into the rod and is positioned to extend within the cylinders defined by the annular chambers. The bore contains an integrated thermocouple pack which also extends through the cylinders defined by the annular chambers.

The integrated thermocouple pack includes a thermocouple pack sheath that is dimensioned to fit within the bore, and a common wire and a plurality of thermocouple wires are disposed within the sheath. The common wire is constructed of a first conductive material and it extends through the cylinders defined by the annular chambers. The thermocouple wires are also constructed of the first conductive material, but at least a portion of the thermocouple wires is constructed of a second conductive material so that a thermocouple is formed by the junction of said first and second materials. In the preferred embodiment there are a plurality of thermocouple wires at least equal in number to the number of annular chambes to be monitored and the thermocouple wires are disposed in the pack sheath to extend through the cylinders defined by the annular chambers and are connected to the outer end of the common wire. The thermocouple wires are also constructed and dimensioned to form at least one thermocouple couple proximate to each annular chamber with one of said thermocouple wires forming a thermocouple proximate to one of said chambers for producing electromotive forces corresponding to the temperatures of the rods proximate to said annular chambers. In the preferred embodiment, each thermocouple wire is constructed to form two thermocouple junctions, one inside a cylinder defined by an annular chamber and the other being disposed outside the cylinder. Electrical insulation is disposed within the pack sheath for insulating the first and second type wires, one from the other, and from the pack sheath itself. A heater cable can also be inserted within the integrated pack to provide in situ calibration and reactor coolant level detection.

Although the probe has been described herein with reference to gamma thermometers, it will be understood that the probe has other applications. For example, U.S. Pat. No. 4,406,011 discloses that gamma thermometers may be used as coolant level detectors in nuclear reactors.

BRIEF DESCRIPTION OF THE DRAWINGS

The present invention may best be understood by reference to the following Detailed Description of a preferred embodiment of the invention, and variations thereof, when considered in conjunction with the drawings in which.

DETAILED DESCRIPTION OF THE PREFERRED EMBODIMENTS

Figure 1:
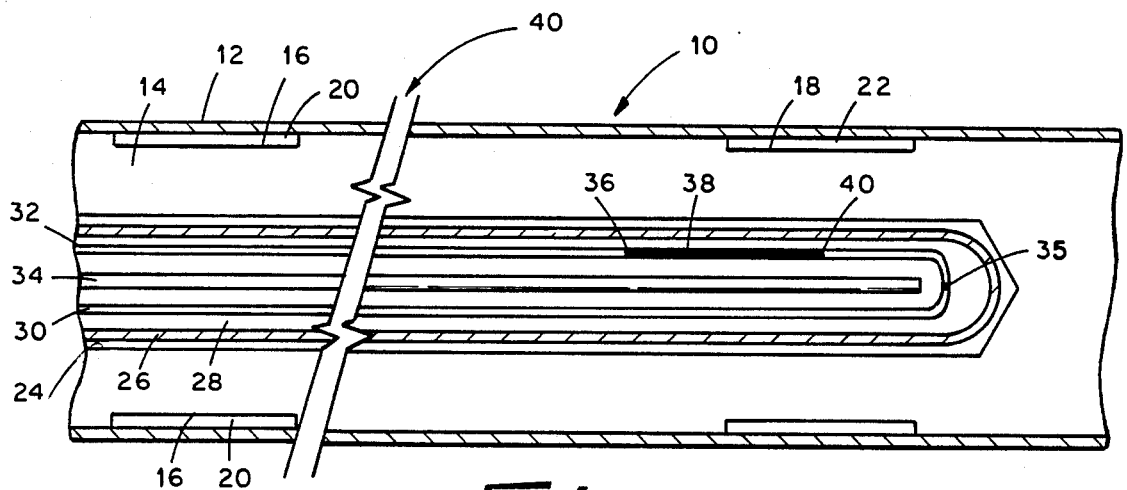
FIG. 1 is a diagrammatical broken cross-sectional view of a gamma thermometer probe embodying one form of the present invention, the section view being taken through the length of the probe.

Referring now to the drawings in which like reference characters designate like or corresponding parts throughout the several views, there is shown in FIG. 1 a cross-sectional, diagrammatic, broken away view of a gamma thermometer probe 10 embodying one form of the present invention. The thermometer probe 10 includes an outer stainless steel sheath 12 that is cylindrical in shape with a stainless steel cylindrical rod 14 tightly fitted within the sheath 12. Preferably, the sheath 12 is swagged over the rod 14 to insure a seal between the sheath 12 and the rod 14. Annular recesses 16 and 18 are formed in the outer surface of the rod 14 and in combination with the sheath 12 to form annular chambers 20 and 22. When the sheath 12 is fitted over the rod 14, it is preferably done in an argon or other gas filled environment so that the chambers 20 and 22 are gas filled.

It will be understood that FIG. 1 is broken away so that it shows only two chambers 20 and 22, but in most applications, a gamma thermometer will have more than two such chambers, typically, eight to twelve chambers. In FIG. 1, chamber 20 represents the first or innermost chamber and chamber 22 represents the outermost end chamber.

The chambers 20 and 22 are designed to resist heat flow so that when thermal energy is generated in the rod 14 by gamma radiation or other radiation, hot spots will develop within the cylinders defined by the chambers 20 and 22. Typically, the gamma thermometer probe 10 will be immersed in a liquid coolant within a reactor (not shown). Thus, the heat in the rod 14 will flow radially outwardly along most of the rod 14. However, within the cylinders defined by the chambers 20 and 22 heat flow must first be directed axially and then radially in order to go around the heat resistant chambers 20 and 22. Therefore, the rod 14 within the cylinder defined by the annular chambers 20 and 22 will be heated to a higher temperature by the gamma radiation.

A bore 24 is formed down the longitudinal center of the rod 14 and it passes through the cylinders defined by the chamber 20 and 22. Disposed within this bore 24 is a cable pack sheath 26, and within the sheath 26 is insulation 28 which is preferably powdered alumina, but it can be any other appropriate insulating material. A first type wire 30, a second type wire 32 and a heater cable 34 are also disposed within the sheath 26 and extend for substantially the length thereof. Although not shown, the heater cable 34 is preferably grounded at its outer end to the sheath 26.

The first type wire 30 is constructed of a first conductive material, preferably alumel. The second type wire 32 has at least a portion thereof constructed of a second type material, different from the first type of material, preferably chromel. Both wires 30 and 32 extend to a junction 35 where they are joined. In FIG. 1 the first type wire 30 is constructed entirely of alumel from its inner end to the junction 35 and is a common wire to all second type wires 32. The second type wire 32 is constructed primarily of alumel, and the alumel portion extends from the inner end (the left end as shown in FIG. 1) of the gamma thermometer probe 10 to a junction 36 which is located about 1.5 inches to the left of the cylinder defined by chamber 22. A chromel wire segment 38 extends from the junction 36 to a second junction 40 which is located in the approximate center of the cylinder defined by the chamber 22. The remainder of the wire 32 from the junction 40 to the junction 35 is constructed of alumel. Therefore, the junction 35 is an alumel to alumel junction and does not constitute a thermocouple. The junctions 36 and 40, however, are alumel-chromel junctions and do constitute thermocouples. The junctions 36 and 40 will produce an electromotive force between wires 30 and 32 that is proportional to the temperature difference of the rod 14 along its axis between the positions of junctions 36 and 40 and is therefore proportional to the radiation being absorbed by the thermometer probe 10. The heater cable 34 may be used to produce heat for such purposes as calibrating the gamma thermometer probe 10, and the heater cable 34 may be composed of multi-segmented heated sections so that heat is only applied in the regions around the chambers.

Figure 2:
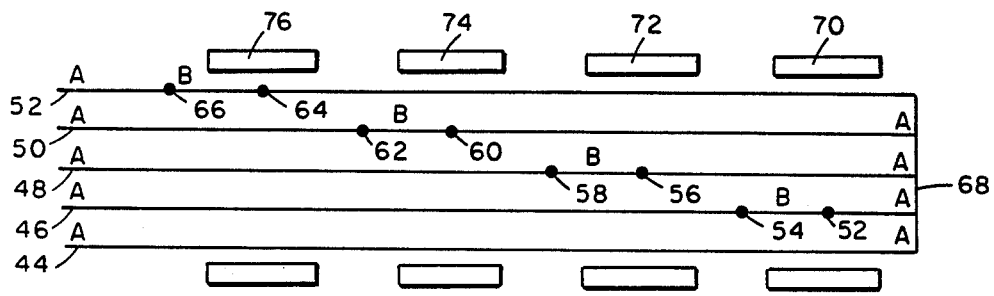
FIG. 2 is a diagrammatical representation of a circuit demonstrating one form of the present invention.

It will be understood that FIG. 1 is a diagrammatic in that it only shows one of the second type wires 32. In actual construction, the number of second type wires 32 usually would be equal to the number of desired chambers to be monitored. For example, there is shown in FIG. 2 a schematic diagram of a gamma thermometer 42 constructed to monitor the temperature at four regions. FIG. 2 is basically a representation of a wiring layout in which wire 44 is a first type wire constructed of material A and is comparable to wire 30 shown in FIG. 1. The remaining wires 46, 48, 50 and 52 are wires of the second type and are constructed, at least in part, of a material B. The wires 46, 48, 50 and 52 correspond in function to wire 32 shown in FIG. 1. Junction pairs 52 and 54, 56 and 58, 60 and 62, and 4 and 66 are formed in wires 46, 48, 50 and 52, respectively, and constitute thermocouple junctions. The wire sections between the junction pairs, that is, between junctions 52 and 54, 56 and 58, 60 and 62, and 64 and 66 are type B material, preferably chromel, and the remainder of wires 44, 46, 48, 50 and 52 are constructed of the type A material, preferably alumel. All of the wires 44-52 are electrically connected together at their outer (right) ends as represented by junction line 68 in FIG. 2.

For the purpose of illustration, representations of annular chambers 70, 72, 74 and 76 in cross-section are shown in FIG. 2 and these chambers correspond to chambers 20 and 22 shown in FIG. 1. Although the cylindrical rod 14 is not shown in FIG. 2, it will be appreciated that junctions 52, 56, 60 and 64 are disposed in the centers of cylinders of a stainless steel rod defined by the chambers 70, 72, 74 and 76, respectively, and that the junctions 54, 58, 62 and 66 are disposed to the left of the chambers 70, 72, 74 and 76. In this construction the voltage between wires 44 and 46 will be proportional to the temperature difference between the thermocouple junctions 52 and 54, and in like manner, the voltages on wires 48, 50 and 52 relative to wire 44 will be proportional to the temperature differences between the thermocouple junctions 56 and 58, 60 and 62, and 64 and 66, respectively. Thus, the voltages on wires 46-52 are indicative of axial heat flow in the rod 14 and of the radiation being absorbed by the rod 14.

Figure 3:
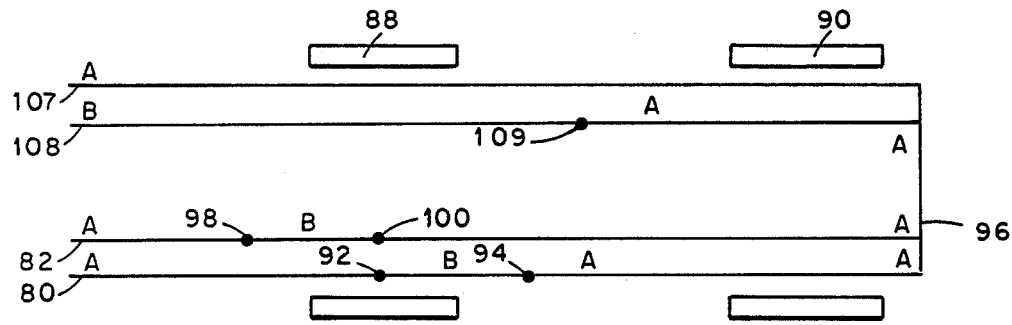
FIG. 3 is a detail view diagrammatically showing an alternate construction of the gamma thermometer probe.

FIG. 3 shows an embodiment of the invention that doubles the sensitivity of the gamma thermometer probe 10 by using two wires to measure the temperature difference at each chamber. In this embodiment, wires 80 and 82 extend in a gamma thermometer through annular chambers 88 and 90 to a common junction 96 to measure gamma radiation in the manner described above. In this embodiment wire 80 is constructed of alumel except for a chromel section between junctions 92 and 94, and wire 82 is alumel except for a chromel section between junction 98 and 100. The junctions 92 and 100 are positioned in the center of the cylinder defined by chamber 88 while junctions 94 and 98 are disposed on opposite sides of chamber 88. In this construction, assuming the region within the chamber 88 is hot compared to the region outside the chamber 88, the voltage appearing between wires 80 and 82 will be the sum of the voltages produced by junctions 92 and 94 and junctions 98 and 100. Then, the sensitivity of the device shown in FIG. 3 will be twice the sensitivity of the gamma thermometer illustrated in FIGS. 1 or 2. That is, the same temperature difference in the region of chamber 88 will produce twice the voltage potential using the device of FIG. 3 as compared to the apparatus shown in FIG. 2.

The circuit of FIG. 3 also includes a common wire 107 constructed entirely of alumel and wire 108 which is constructed or chromel on the left side of junction 109 and alumel on the right side of junction 109. Wires 107 and 108 may be joined at junction 96 or may be on independent circuits. The junction 109 is positioned remotely from chambers 88 and 90 and the voltage between wires 107 and 108 will be indicative of the absolute temperature at junction 109. A junction such as 109 can be placed at any position to measure the absolute temperature.

Figure 4:
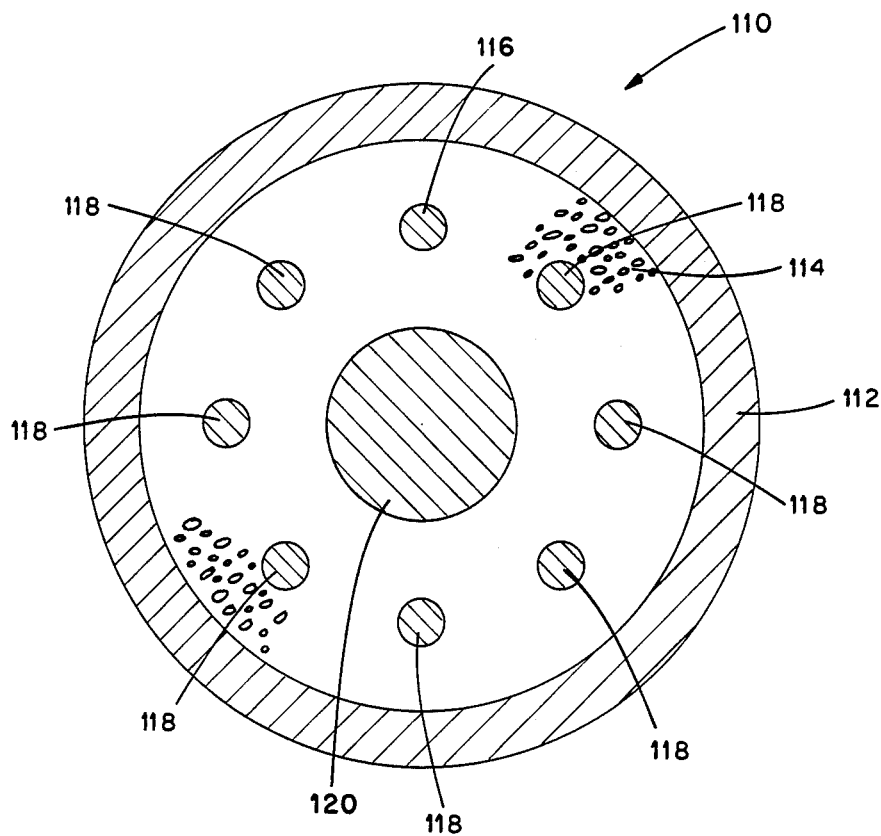
FIG. 4 is a transverse cross-sectional view of a thermocouple pack including a pack sheath, thermocouple wiring, a center heater cable and insulation.

Referring now to FIG. 4, there is shown a transverse cross-section of an integrated thermocouple pack for use in the present invention. This cross-sectional view is taken across the width of the pack 110 and is perpendicular to views shown in FIGS. 1-3. The integrated thermocouple pack 110 corresponds to the integrated thermocouple packs shown in FIG. 1 and partially shown in FIGS. 2-3. Thermocouple pack 110 includes an outer pack sheat 112 that is constructed of stainless steel and corresponds to the sheath 26 shown in FIG. 1. Encased within the sheath 112 is insulating material 114, preferably powered alumina, and a plurality of wires 116 and 118 are positioned within the sheath 112 in a concentric pattern with respect to the sheath. Wire 116 is constructed of a first type of material, such as alumel, and the seven wires 118 are constructed at least in part of a second type of material, such as chromel, and they correspond in construction to wires 32 of FIG. 1 and wires 46, 48, 50 and 52 of FIG. 2. Wire 116 is a common wire and corresponds to wire 30 shown in FIG. 1, and wire 44 shown in FIG. 2. The heater cable 120 is disposed in the center of the sheath 112 and corresponds to the heater cable 34 shown in FIG. 1. The wires 116 and 118 are disposed equidistantly and, in this case, concentrically about the heater cable 120, and the insulation 114 electrically insulates the wires 116 and 118, one from the other, and from the sheath 112 and the heater 120.

The thermocouple pack 110 will run the length of the area to be monitored. For example, the sheath 112 is comparable to the sheath 26 shown in FIG. 1. Each of the wires 116 and 118 will run the length of the sheath 112 and all of the wires will be electrically joined at their outer ends. The thermocouple junctions formed in the wires 118 are created by constructing the wires 118 at least in part of a second and different type material than used in wire 116. Thus, the wires 118 will have thermocouple junctions in them such as junctions 36 and 40 shown in FIG. 1. The central heater cable lead 120 may be of a continuous heating material or may include segmented heated sections joined to a low resistance material such a nickel. Further it may utilize a lead in the place of wires 116 or 118 as the return or it may be joined to the sheath 112 to form the current returns. In this integrated construction, the thermocouple pack 110 of the present invention may be constructed having a smaller diameter than thermocouple packs of conventional gamma thermometers even though the same size wiring is used, or the pack may be constructed having the same size diameter while using larger size thermocouple wires 116 and 118.

Although exemplary embodiments are disclosed in the foregoing detailed description, it will be understood that the invention is capable of numerous rearrangements, modifications or substitutions of parts without departing from the scope of the invention as defined by the appended claims. In particular, it should be noted that the dimensions of the thermocouple wires, the number of thermocouple wires, the positioning of the thermocouples and the size of the gamma thermometer may vary greatly, depending upon the particular application, without departing from cope of the invention. It should also be noted that the structure of the probe's main body (sheath 12 and rod 14) may vary. In the embodiments discussed above, such as shown in FIG. 1, the chambers 22 are formed for the purposes of creating hot and cold regions in rod 14 in the presence of radiation. These hot and cold regions may be produced by other configurations. For example the thermometer of U.S. Pat. No. 4,425,297 produces hot and cold regions in the presence of radiation by varying the cross-section of the thermometer. The present invention is not limited to any particular thermometer probe structure for producing hot and cold regions.

What is claimed is:

1. A gamma thermometer probe for detecting heat produced within the thermometer probe comprising:
    an outer elongate thermometer sheath having a cylindrical cross-section, a length, an outer end and an inner end;
    an elongate rod having a cylindrical cross-section fitted within said elongate thermometer sheath, said rod being constructed of material that absorbs radiation and produces heat;
    a plurality of annular recesses formed between said rod, and sheath and being spaced apart along the length of said rod, said recesses forming annular chambers that are resistive to heat flow;
    a longitudinal bore extending axially into said rod and being positioned to extend through the cylinders defined by said annular chambers;
    an integrated thermocouple pack dimensioned to fit within said longitudinal bore and extending through the cylinders defined by said annular chambers, said integrated thermocouple pack comprising:
        a first type wire constructed of a first conductive material disposed within said bore and extending through the cylinders defined by said annular chambers, said first type wire having inner and outer ends;
        a plurality of second type wires at least equal in number to the number of annular chambers to be monitored, said second type wires being disposed in said bore to extend through the cylinders defined by said annular chambers and being connected to the outer end of said first type wire; each of said second type wires comprising:
            an outer segment constructed of the first conductive material, having outer and inner ends and being connected at its outer end to the outer end of the first type wire;
            a middle segment constructed of a second conductive material that is different from the first conductive material, having outer and inner ends and being connected at its outer end to the inner end of said outer segment to form a first thermocouple junction in said second type wire;
            an inner segment constructed of the first conductive material, having outer and inner ends, and being connected at its outer end to the inner end of said middle segment to form a second thermocouple junction having an opposite polarity from said first thermocouple junction, said first and second thermocouple junctions forming a thermocouple pair;
        said second type wires being constructed with different length outer segments and different length inner segments dimensioned so that each annular recess has at least one thermocouple pair located proximately thereto with one of said thermocouple junctions disposed within the cylinder defined by said annular recess; and
    electrical insulation disposed within said bore for insulating said first and second type wires, one from the other, and from said bore.

2. The probe of claim 1 further comprising a heater cable disposed in said pack sheath and extending the length thereof, said second type wires being spaced apart from said heater cable and being insulated electrically from said heater cable by said insulation.

3. The probe of claim 1 wherein said second type wires are constructed with a relatively small middle segment dimensioned and positioned to form one thermocouple junction within a cylinder defined by one of said annular chambers and to form a second thermocouple junction proximate to the same one of said annular cylinders but outside of the cylinder defined thereby, whereby said first and second thermocouple junctions produce a voltage difference corresponding in magnitude to the axial temperature difference between inside and outside the cylinder defined by said chamber.

4. In a probe having an elongate main body, said body being configured to produce hot regions and cold regions therein, relative one to the other, in the presence of radiation, the improvement comprising:
    a longitudinal bore formed in, and being generally parallel to the length of, said main body;
    a first type wire constructed of a first conductive material disposed within said bore and extending through said regions of said main body, said first type wire having inner and outer ends;
    a plurality of second type wires for monitoring the temperature of said regions and corresponding in number to the number of regions to be monitored, said second type wires being disposed in said bore to extend through said regions of said main body and being connected to the outer end of said first type wire;

each of said second type wires comprising:
- an outer segment constructed of the first conductive material, having outer and inner ends and being connected at its outer end to the outer end of the first type wire;
- a middle segment constructed of a second conductive material that is different from the first conductive material, having outer and inner ends and being connected at its outer end to the inner end of said outer segment to form a first thermocouple junction in said second type wire;
- an inner segment constructed of the first conductive material, having outer and inner ends, and being connected at its outer end to the inner end of said middle segment to form a second thermocouple junction having an opposite polarity from said first thermocouple junction, said first and second thermocouple junctions forming a thermocouple pair;

said second type wires being constructed with different length outer segments and different length inner segments dimensioned so that each of said regions has at least one thermocouple pair located proximately thereto with one of said thermocouple junctions disposed within said region; and electrical insulation disposed within said bore for insulating said first and second type wires, one from the other, and from said bore.

* * * * *